United States Patent [19]
Cygnor et al.

[11] Patent Number: 6,022,197
[45] Date of Patent: Feb. 8, 2000

[54] AIRCRAFT PUMP SYSTEM WITH INTERNAL PRESSURE CONTROL, COMPRISING A REGENERATIVE PUMP AND A CENTRIFUGAL PUMP

[75] Inventors: John Edward Cygnor; Jeff Clark Miller, both of Rockford, Ill.

[73] Assignee: Sundstrand Corporation, Rockford, Ill.

[21] Appl. No.: 08/970,651

[22] Filed: Nov. 14, 1997

[51] Int. Cl.[7] .................................................. F04B 23/14
[52] U.S. Cl. ........................... 417/203; 417/87; 417/251; 417/299; 60/734
[58] Field of Search .................... 417/203, 251, 417/299, 87; 60/734

[56] References Cited

U.S. PATENT DOCUMENTS

| | | | |
|---|---|---|---|
| 4,607,486 | 8/1986 | Cole | 60/734 |
| 4,864,815 | 9/1989 | Cygnor | 60/39.141 X |
| 5,123,810 | 6/1992 | Hansen | 415/143 |

Primary Examiner—Timothy S. Thorpe
Assistant Examiner—Ehud Gartenberg
Attorney, Agent, or Firm—Wood, Phillips, VanSanten, Clark & Mortimer

[57] ABSTRACT

Difficulties in adapting centrifugal pumps for use as fuel pumps for turbine powered aircraft are avoided in a system including a centrifugal volute pump (22) on a common shaft (18) with a regenerative pump (24). A pressure responsive throttling valve (46) is connected to the inlet (50) of the regenerative pump (24) so as to cause the regenerative pump (24) to provide fuel at a desired, substantially constant pressure while a check valve (80) is connected to the outlet (72) of the centrifugal volute pump (22) to allow flow from the volute (72) but not the reverse. The outlet side of the check valve (80) can also be selectively connected to the outlet (84) of the regenerative pump (24) so that when the pumps are rotating relatively slowly, the regenerative pump (24) will pump fuel at the desired, substantially constant pressure and, as rotational speed increases, the check valve (80) will open when the centrifugal volute pump (22) is pumping fuel at or about the desired substantially constant pressure.

11 Claims, 4 Drawing Sheets

AIRCRAFT PUMP SYSTEM WITH INTERNAL PRESSURE CONTROL, COMPRISING A REGENERATIVE PUMP AND A CENTRIFUGAL PUMP

FIELD OF THE INVENTION

This invention relates to pumps, and more particularly, to fuel pumps for turbine powered aircraft.

BACKGROUND OF THE INVENTION

It has long been desirable to employ high speed centrifugal pumps as fuel pumps in aircraft employing turbine engines. Fuels used in aircraft turbine engines are typically of low lubricity. Centrifugal pumps are ideally suited for pumping low lubricity liquids without excessive wear, thus providing one reason for the desirability as an aircraft fuel pump.

Further, in many cases, for a given pumping capacity at rated engine speed, a centrifugal pump will occupy a considerably lesser volume than a typical positive displacement pump used for the same purpose. And this reduction in volume translates into a weight savings as well.

In aircraft, a reduction of the size of the envelope occupied by a given component provides the aircraft designer with greater flexibility in achieving an aerodynamically slippery design. Consequently, a smaller envelope made possible by reduced volume raises the potential for the more efficient operation of aircraft through the reduction in drag.

At the same time, the accompanying weight reduction enables aircraft range to be increased. The weight carrying capability of the aircraft heretofore devoted to transporting a positive displacement fuel pump can, in part, be used to increase fuel carrying capacity and/or other pay loads.

Notwithstanding the foregoing, centrifugal pumps as fuel pumps in turbine powered aircraft have not yet achieved an appreciable degree of utilization for the purpose. Conventional centrifugal volute pumps do not have the ability to provide fuel flow at high pressure at low engine speeds, particularly during engine starting sequences. To overcome this difficulty, it has been proposed to utilize positive displacement pumps in combination with centrifugal pumps with various decoupling schemes. A positive displacement pump is utilized to provide fuel flow during low engine speeds as during start up and when a suitable engine speed has been attained, the positive displacement pump is decoupled from the engine and the pumping operation assumed entirely by a centrifugal pump, typically of the conventional volute type.

While this approach appears sound in theory, in practice, during the transition from a low speed or a start operation to normal speed operation has been troublesome. A pressure instability will exist at the transition and that in turn can result in a disturbance in the fuel flow to the engine. The disturbance in fuel flow raises the possibility of an engine flame out.

The present invention is directed to overcoming one or more of the above problems.

SUMMARY OF THE INVENTION

It is the principal object of the invention to provide a new and improved pump. More specifically, it is an object of the invention to provide an all centrifugal pump for use as a fuel pump on turbine powered aircraft.

An exemplary embodiment of the invention achieves the foregoing objects in a centrifugal pump based fuel system for turbine powered aircraft which includes a centrifugal volute pump adapted to pump fuel at pressures proportional to rotational speed. The centrifugal volute pump has an inlet and an outlet. Also included is a regenerative pump adapted to pump fuel at pressures considerably higher than those of the centrifugal volute pump at the same rotational speed. The regenerative pump also has an inlet and an outlet. Means are connected to at least one of the regenerative pump inlet and outlet for causing the regenerative pump to pump fuel at a desired substantially constant pressure and a check valve having an outlet side and an inlet side is provided. The inlet side is connected to the centrifugal volute pump outlet and arranged to allow flow from the centrifugal volute pump outlet to the outlet side of the check valve but not the reverse. Means are provided for selectively connecting the outlet side to the regenerative pump outlet. As a consequence, when the pumps are rotating relatively slowly, the regenerative pump will pump fuel at the desired substantially constant pressure and as rotational speed increases, the check valve will open when the centrifugal volute pump is pumping fuel at or above the desired substantially constant pressure.

In a highly preferred embodiment, the system includes a means for disabling the regenerative pump when the centrifugal volute pump is pumping fuel at or above the desired substantially constant pressure. Preferably, the disabling means comprises a pressure responsive valve for halting fuel flow to the regenerative pump inlet.

In a preferred embodiment, the pressure responsive means includes a throttling means for increasingly throttling the flow of fuel to the regenerative pump inlet as pressure increases whereby the throttling means comprises the means for causing the regenerative pump to pump fuel at a desired substantially constant pressure.

A highly preferred form of the invention further includes an ejector arranged with the pressure responsive valve to be connected to the regenerative pump outlet when the regenerative pump is to be disabled so as to assure that any fluid within the regenerative pump is ejected to minimize pumping energy requirements.

Other objects and advantages will become apparent from the following specification taken in connection with the accompanying drawings.

DESCRIPTION OF THE PREFERRED EMBODIMENT

Figure 1:
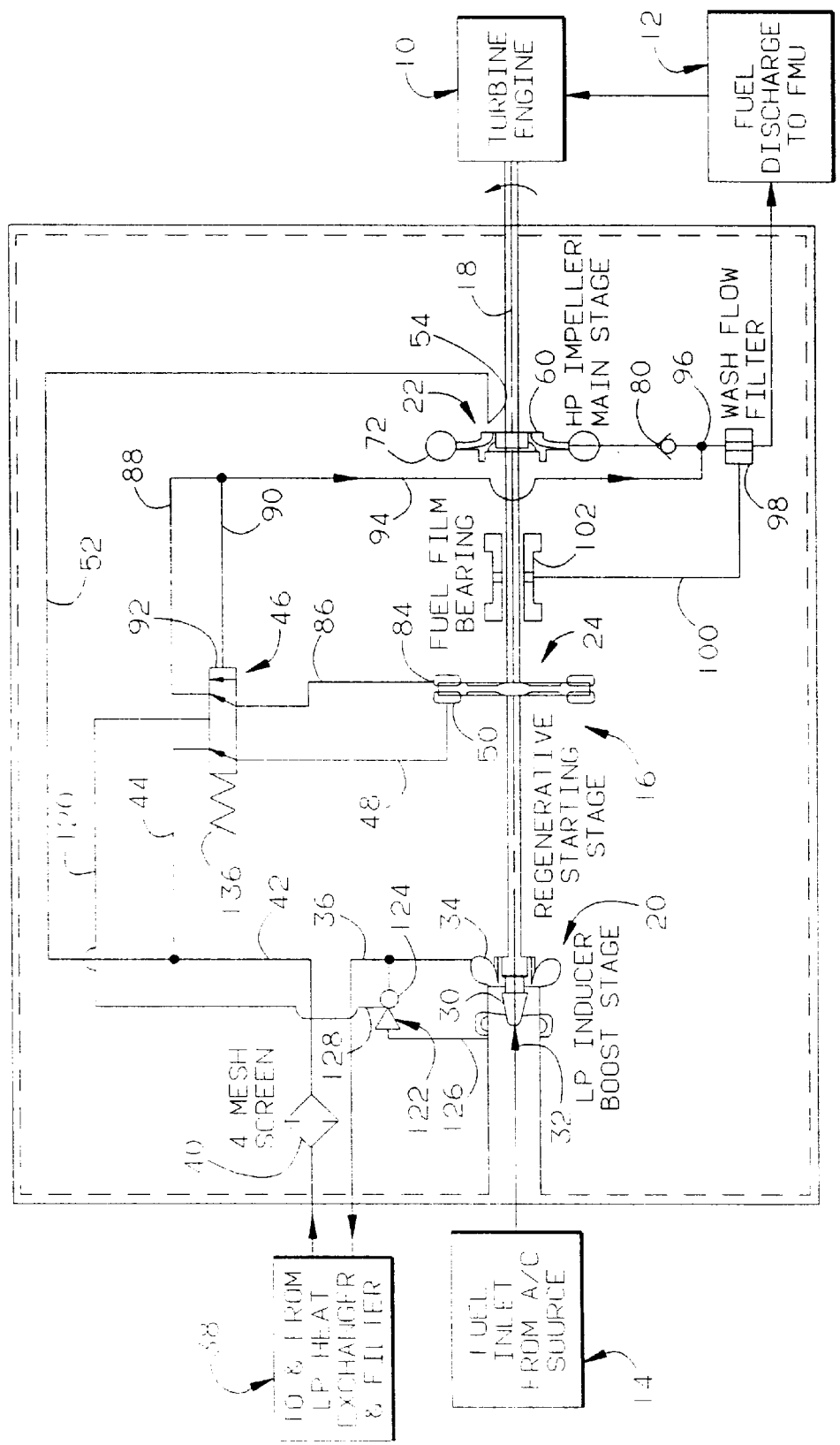
FIG. 1 is a schematic of a fuel pumping system made according to the invention.

With reference to FIG. 1, a fuel system for an aircraft powered by turbine engines is illustrated in schematic form. One or more turbine engines are generally designated 10 and are provided with fuel by a fuel control system, generally designated 12, of conventional construction.

A source of fuel is generally designated 14 and provides fuel for combustion within the engine 10 as well as for conventional on board cooling purposes as is well known. In some cases, the fuel, when under pressure, may be used as a hydraulic fluid for altering engine geometry as is well known.

As illustrated, the source 14 provides fuel to a centrifugal pump, generally designated 16, made according to the invention. In a preferred embodiment, the pump 16 includes a single shaft 18 which is driven by the turbine engine 10 at speeds typically in the range of 25,000 to 40,000 RPM.

One end of the shaft 18 carries a conventional inducer, generally designated 20. The inducer may be generally of the configuration illustrated in commonly assigned U.S. Pat. No. 5,061,151 issued Oct. 29, 1991, to Steiger, the entire disclosure of which is herein incorporated by reference.

Oppositely of the inducer 20, the shaft 18 may drive a conventional centrifugal volute pump, generally designated 22. The particular configuration of the volute pump 22 is conventional and forms no part of the present invention.

Intermediate the ends of the shaft 18 a regenerative pump, generally designated 24. Again, the regenerative pump 24 may be of conventional construction and forms no part of the present invention. Representative examples of regenerative pumps of the type of concern are illustrated in commonly assigned U.S. Pat. No. 5,096,386 issued Mar. 17, 1992 to Kassel and 5,265,996 issued Nov. 30, 1993 to Westhoff, et al. The entire disclosures of both such patents are herein incorporated by reference. As is well known, a regenerative pump will pump fluid at 22½ to 3 times the head of a similar centrifugal volute pump.

Figure 2:
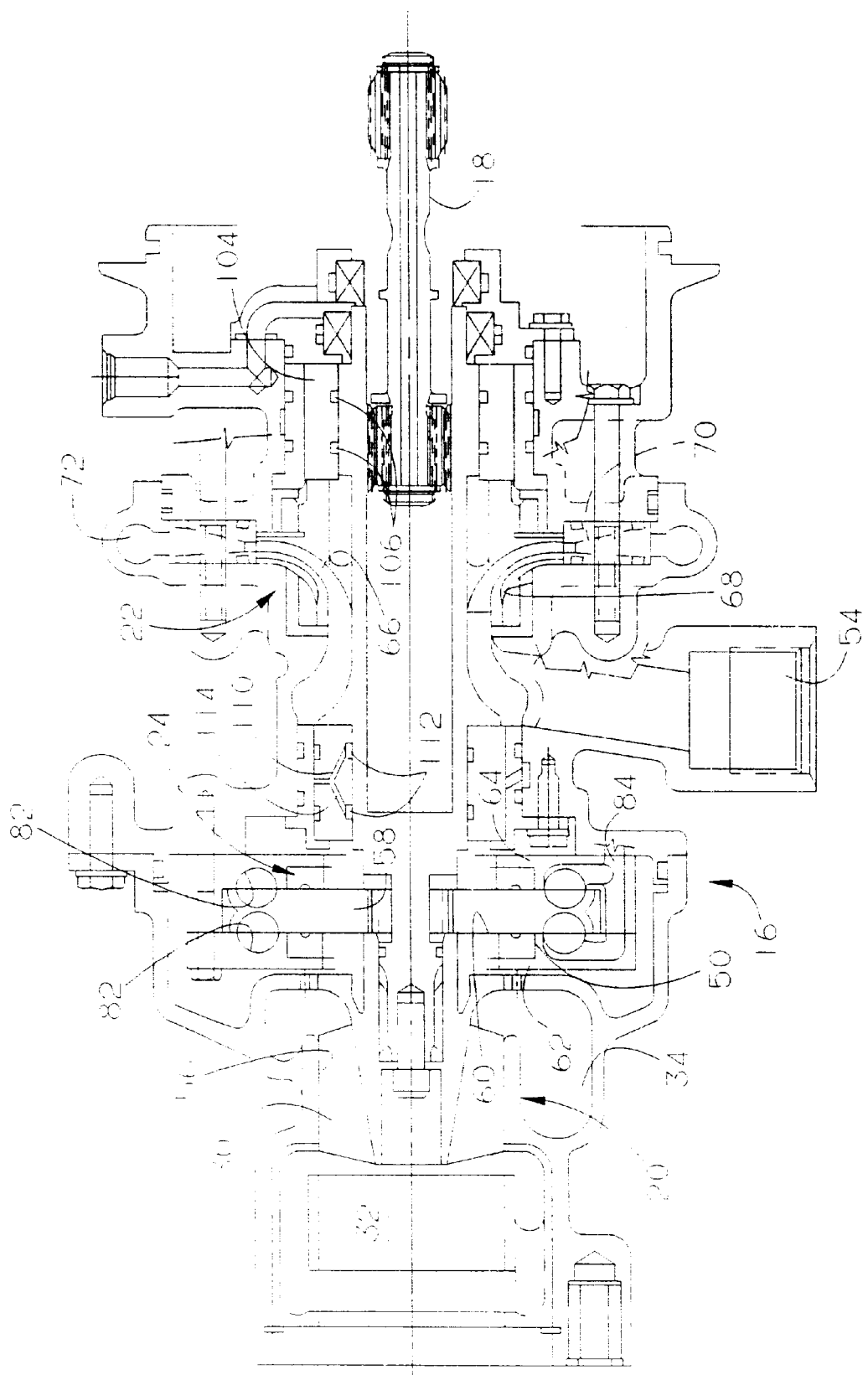
FIG. 2 is a sectional view of a centrifugal fuel pump employed in the invention.

Referring now to FIGS. 1 and 2, the pump 16 will be explained in greater detail. The inducer 20 includes a generally helical impeller 30 on an end of the shaft 18. Generally co-axial with the shaft 18 adjacent one end thereof is an inlet 32 which is ultimately connected to the source 14. An outlet volute 34 surrounds the impeller 30 and is connected via a line 36 to a heat exchanger and filtering system, generally designated 38, of conventional construction. Thus, fuel from the source 14 is induced to flow by the inducer 20 through the line 36 to be cooled and filtered within the system 38. From there, it flows through a mesh filter 40 to a line 42. The line 42 is connected via a conduit 44 to a transition valve, generally designated 46, which is a pressure responsive, throttling valve. For low system pressures, the valve assumes the position illustrated in FIG. 1 and as a consequence, it will be appreciated that the line 44 connects through the valve 46 to a line 48 which in turn extends to the inlet 50 of the regenerative pump 24.

A second branch 52 extends from the line 42 to the inlet 54 of the centrifugal volute pump 22. As can be seen in FIG. 2, the inducer impeller 30 is contained within a chamber 56 while the impeller 58 for the regenerative pump 24 is contained within a chamber 60 defined by opposed side plates 62 and 64, while the impeller 66 of the centrifugal volute pump 22 is disposed within a chamber 68 to discharge radially outwardly through a diffuser 70 into a circumferential volute 72 of conventional construction. The volute 72 of the centrifugal volute pump 22 serves as the outlet for the same and is connected to a check valve 80, also shown in FIG. 3.

Though not shown herein, those skilled in the art will appreciate that the inlet 50 of the regenerative pump 24 is separated from the outlet by baffles (not shown) that are located in circumferential channels 82 in the plates 62 and 64. The outlet shown schematically at 84 in FIG. 1 is separated by the baffles mentioned above from the inlet 50 and is connected via a line 86 to the transition valve 46. At low system pressures, flow from the outlet 84 will be directed through the valve 46 to a line 88 whereat it is applied via a line 90 to a pressure responsive surface 92 on the valve 46 as well as to a line 94 connected to the downstream side of the check valve 80 at a junction 96.

The junction 96 is, in turn, connected via a filter 98 to the fuel control system 12 as well as to a line 100 which directs the fluid under pressure to hydrostatic bearings 102 for the shaft 18. The bearings 102 are preferably of the configuration disclosed in the commonly assigned application of Cygnor,et al., U.S. Pat. No. 08/970,850 filed Nov. 14, 1997 and entitled "High Speed Self-lubricated Fuel Pump with Hydrostatic Bearings" (assignee's internal docket number B05209-AT3-USA). The entire disclosure of such application is herein incorporated by reference.

Referring to FIG. 2, two sets of the bearings 102 are employed. One set includes a bearing block 104 which has an interior bore in which the shaft 18 is received. Within the bore are four, equally angularly spaced recesses 106 which are connected as by a port 108 to the junction 96. A second bearing block 110 is axially spaced from the block 104 so as to be located between the regenerative pump 24 and the centrifugal volute pump 22. The block 110, on it's interior bore, includes two rows of equally angularly spaced recesses 112, there being four recesses in each of the rows 11 2. A port 114 may connect the recesses 112 to the junction 96.

Returning now to FIG. 1, an ejector line 120 extends from the transition valve 46 to an ejector, generally designated 122, to be described in greater detail hereinafter. The ejector 1 22 includes a pressure fluid inlet 124 connected to the volute 34 of the inducer 20 as well as an outlet 126 connected to the inlet 32 of the inducer 20. An ejection inlet 128 also forms part of the ejector 122 and the arrangement is such that as pressurized fluid flows through the inlet 124 to the outlet 126, low pressure is produced at the inlet 128. When the valve 46 shifts from the position illustrated in FIG. 1 to connect the outlet line 86 to the ejector from the position illustrated in FIG. 1 to connect the outlet line 86 to the ejector line 120, the ejector 122 will act to evacuate the interior chamber 60 (FIG. 2) of the regenerative pump 24 so that no energy will be expended pumping fluid therein and the high pressures of fluid that would build up if fluid were permitted to remain therein are relieved.

Figure 3:
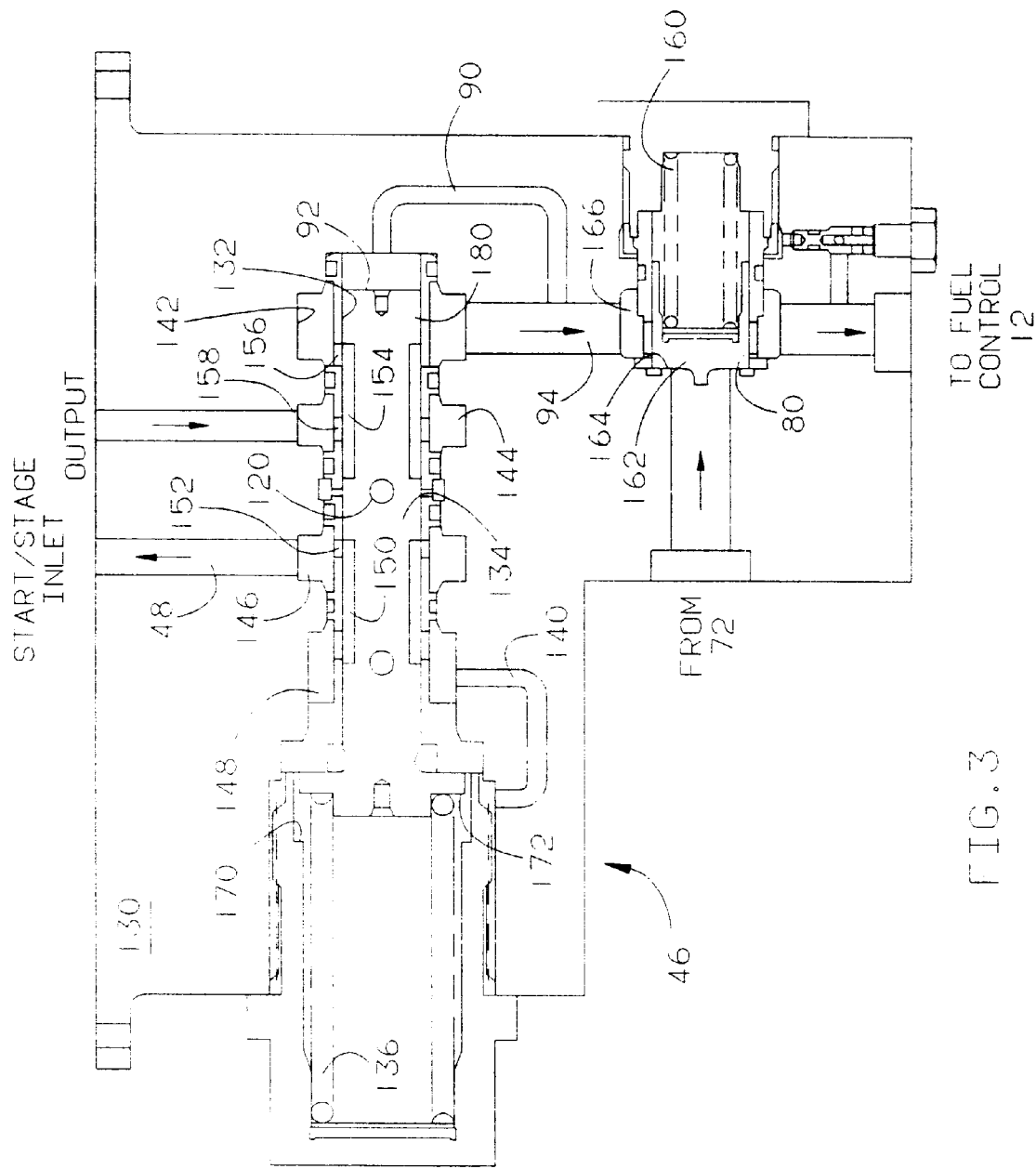
FIG. 3 is a sectional view of a transition valve employed in the system.

Turning now to FIG. 3, the transition valve 46 will be described in greater detail. The same includes a valve housing 130 having an interior bore 132 in which a valve spool 134 is reciprocally received. As illustrated in FIG. 3, the right hand end of the valve spool 134 bears the pressure responsive surface 92 mentioned previously.

Opposing the pressure responsive surface 92 within the housing 130 is a compression coil spring 136 which tends to urge the spool 134 to the right as viewed in FIG. 3. The pressure at the line 36, that is, at the outlet 34 of the inducer 20, is also applied to the spool 134 oppositely of the surface 92 via an 15 internal passage 140.

Referring to FIG. 3, an annulus 142 about the bore 130 is connected to the line 94. An axially spaced annulus 144 is connected to the outlet 84 (FIG. 1) of the regenerative pump 24 while a further annulus 146 is connected to the line 48, that is, to the inlet 50 of the regenerative pump 24. Still another annulus 148 is connected via the line 44 ultimately to the outlet 34 of the inducer 20.

A peripheral groove 150 in the spool 134 acts in concert with a series of ports 152 aligned with the annulus 146 to throttle flow from the annulus 148 to the annulus 146. That is, the groove 150 and the ports 152 act to throttle flow to the inlet 50 of the regenerative pump 24.

A similar groove 154 in the spool 134 normally establishes fluid communication between ports 156 aligned with the annulus 142 and ports 158 aligned with the annulus 144. This allows flow from the outlet 84 of the regenerative pump 24 to the check valve 80 under certain conditions to be described hereinafter.

A peripheral shoulder 170 within the housing 130 may be abutted by an end 172 of the spool 134. Thus, the shoulder 1 70 serves as a stop to limit leftward movement of the spool 134 as illustrated in FIG. 3.

The check valve 80 is also illustrated in FIG. 3 and includes a compression coil spring 160 urging a valve 1 62 against the seat 164. The valve 162 is exposed to pressure from the volute 72 of the centrifugal volute pump 22 and is surrounded by an annulus 166 which permits fluid from the annulus 142 to flow directly to the fuel control 12 (FIG. 1) even when the valve 162 is seated against the seat 164.

Figure 4:
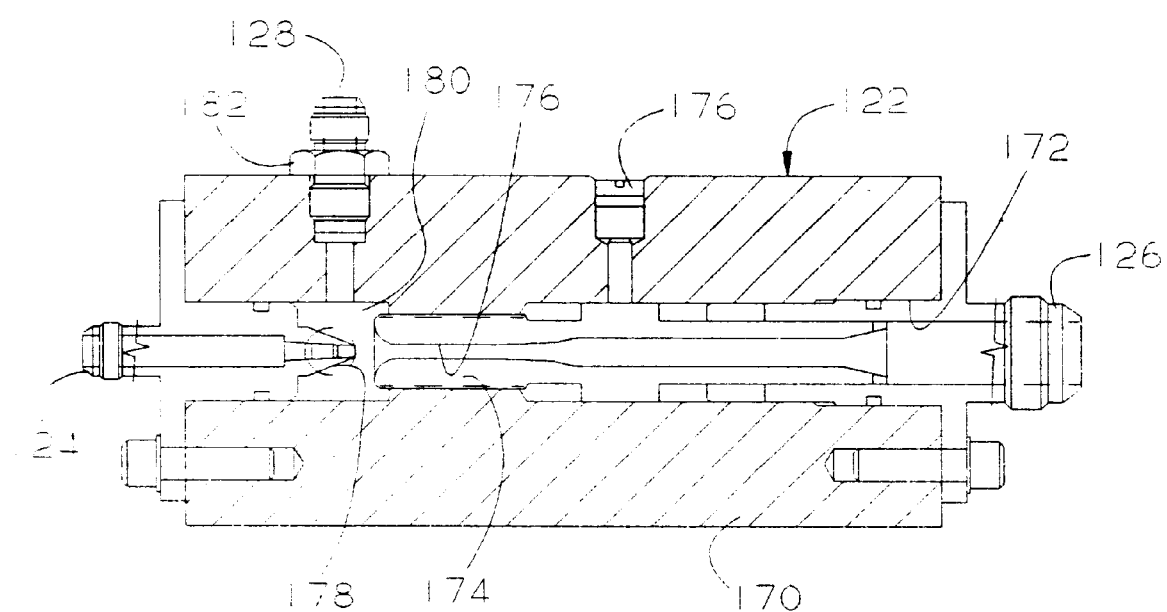
FIG. 4 is a sectional view of an ejector used in the system.

The system is completed by the ejector 122 which is shown in FIG. 4 and which is of by and large conventional construction. A housing 170 includes a bore 172 in which an ejector sleeve 174 is disposed by means of a set screw 176. The sleeve 174 includes a narrowed opening 176 aligned with a nozzle 178 at one end of an interior chamber 180. The nozzle 178 is connected the pressure fluid inlet 124 while the sleeve 174 provides the ejector outlet 126. A fitting 182 provides the ejector fluid inlet 128 to the chamber 180.

Those skilled in the art will recognize that the application of fluid under pressure to the inlet 124 will result in a reduced pressure within the chamber 180, allowing fluid in fluid communication with the fitting 182 to be drawn into the ejector 122 and expelled through the outlet 126.

Operation of the system is generally as follows.

A typical turbine engine such as the engine 10 (FIG. 1) will be accelerated by an appropriate starter to some percent of it's rated speed before a start procedure is initiated. Typically, a value just less than 10% of rated speed might be chosen. Of course, the pump 16 will begin to rotate with the engine 10 during the starting procedure and for a typical configuration, at such a value, the pressure at the outlet 84 of the regenerative pump 24 would be approximately 200 lbs. per square inch greater than the pressure at the inlet 50. At the same time, the pressure differential between the inlet 50 and the outlet volute 72 of the centrifugal volute pump 22 will be virtually nil. Consequently, all fuel pressure required for maintaining the starting sequence at this time is provided by the regenerative pump 24. It will be noted that the presence of the check valve 80 prevents pressurized fuel from backflowing through the centrifugal volute pump 22 at this time.

During the sequence, it is generally preferred that the pressure being provided to the fuel control unit 1 2 be at a relatively constant value, that is, that the pressure differential from the inlet 50 to the outlet 84 of the regenerative pump 24 be relatively constant within a given range of, for example, 60 or 70 psi. To this end, the transition valve 46 acts to maintain a relatively constant pressure differential. Specifically, because the pressure at the outlet 84 of the regenerative pump 24 will be proportional to the square of it's rotational speed, there will be an increase in pressure but this in turn is passed through the transition valve 46 along the conduit 90 to be applied to the pressure responsive surface 92 of the spool 134. As the pressure increases, it will have the effect of urging the spool 134 to the left as viewed in FIG. 3 instituting throttling action as mentioned previously at the interface of the ports 152 and the groove 150 in the spool 134. That is to say, fuel flow from the inducer 30 to the regenerative pump 24 will be throttled. And the degree of throttling will increase as the regenerative pump outlet pressure attempts to increase.

As a consequence, a vapor core will begin to form within the annular channels 82 (FIG. 2) of the regenerative pump 24. As the length of the vapor core increases, the effective pumping volume of the regenerative pump 24 decreases with the result that it's outlet pressure will likewise decrease if rotational speed is constant. However rotational speed is increasing, to offset any pressure decrease caused by the increasing vapor core. In this way, a relatively constant pressure differential across the regenerative pump 24 is maintained at a desired value and fuel at a desired, relatively high pressure is provided to the fuel control unit 12.

At some point in time, as the system continues to accelerate, the pressure at the outlet volute 72 of the centrifugal volute pump 22 will equal and begin to exceed the pressure at the outlet 84 of the regenerative pump 24. At this time, the check valve 80 will open and fuel now pumped by the centrifugal volute pump 22 will flow to the fuel control unit 12. The increase in pressure will also be sensed by the pressure responsive surface 92 of the spool 134 via the conduits 94, 90. This will have the effect of moving the spool 134 completely to the left so that it's end 172 abuts the shoulder stop 170. At this point in time, the land 180 at the right hand end of the spool will block the ports 156 preventing any back flow of fuel to the outlet 86 of the regenerative pump 24.

At substantially the same time, the leftward shift of the spool 134 connects the inlet 50 to the ejector port 120. At this time, of course, the inducer is continuing to operate with the rotation of the shaft 18 and the pressure at it's outlet volute 34 will be greater than at it's inlet 32. Thus, fuel will be flowing through the ejector illustrated in FIG. 4 from the inlet 124 to the outlet 126 creating a low pressure at the ejector inlet fitting 182. As the port 120 is connected to the ejector inlet 128 of the fitting 182, the reduced pressure will be applied to the inlet 50 of the regenerative pump 24. By the very nature of the construction of the regenerative pump 24, the reduced pressure will also be present at the outlet 184; and that will evacuate all fuel from the interior of the regenerative pump 24 so that no energy is expended to pump fuel within the regenerative pump 24 at this time. Any leakage in the system will also be ejected to the inlet 32 of the inducer 20 from which it may ultimately be directed to the inlet 54 of the centrifugal volute pump 22. At this time, as the centrifugal pump is now rotating well above the initial start speed as, for example, at least about 40% of rated speed, it will provide sufficient pressurization of the fuel to provide for operation of the engine 10.

It is to be particularly noted that an extremely smooth transition is obtained that is essentially stepless. Consequently, there is no instability in pressure that could give rise to the potential for a flame-out.

Furthermore, no external signal is required to effect the transition. The same occurs automatically as soon as the centrifugal volute pump 22 is rotating at a sufficiently rapid rate as to generate a pressure that is sufficient to open the check valve 80 and thereby effect the transition.

In general, the construction of the various lands, grooves and ports of the valve 46 are such that fluid communication at the groove 150 and the ports 152 is first closed followed by closure of the ports 156 by the land 180 which in turn is followed by an opening of the port 120 to the ejector.

It has been found that strictly on the pump alone, as opposed to the entire system, that a weight savings of approximately 40% over a conventional positive displacement pump of the same capacity is achieved. The reduction in volume is approximately the same and it bears repeating that no external signal is required to effect the transition, thereby eliminating a possible source of system failure.

An important feature of the invention is the use of the throttling groove 150 and ports 152 on the inlet side of the regenerative pump 24. While other means could be employed to achieve substantially constant pressure at a desired level at the outlet 84 of the pump 24, and indeed, the invention does contemplate, in it's broadest sense, the use of such other means, the provision of the throttling action on the inlet side provides a number of advantages. For one, it enhances the stepless nature of the transfer or transition from the start mode to normal operation. Further, if, for example, throttling were to occur on the outlet side, the regenerative pump 24 would not develop a vapor core, meaning a full volume of fuel would be subject to action of the impeller 58 (FIG. 2). This, in turn, would increase the amount of power required to drive the regenerative pump 24 even though much of it would not be required because of throttling or bypass action at it's outlet. Consequently, in a preferred embodiment of the invention with the throttling means located on the inlet side of the pump 24, power requirements are minimized.

Finally, though not all turbine engines require pressurized fuel as a power source to alter engine geometry, those skilled in the art will readily recognize that the system of the present invention, in addition to the previously identified advantages, provides fuel at sufficiently high pressures even at low engine speeds as to be able to use the fuel as a hydraulic fluid to vary engine geometry in those systems requiring such a feature.

We claim:

1. A centrifugal pump based fuel system for turbine powered aircraft comprising:

a centrifugal volute pump adapted to pump fuel at pressures proportional to rotational speed, said centrifugal volute pump having an inlet and an outlet;

a regenerative pump adapted to pump fuel at pressures considerably higher than those of said centrifugal volute pump at the same rotational speed; said regenerative pump having an inlet and an outlet;

means connected to at least one of said regenerative pump inlet and outlet for causing said regenerative pump to pump fuel at a desired substantially constant pressure;

a check valve having an outlet side and an inlet side, said inlet side being connected to said centrifugal volute pump outlet and arranged to allow flow from said centrifugal volute pump outlet to said outlet side but not the reverse; and means for selectively connecting said outlet side to said regenerative pump outlet;

whereby when said pumps are rotating relatively slowly, said regenerative pump will pump fuel at said desired substantially constant pressure and as rotational speed increases, said check valve will open when said centrifugal volute pump is pumping fuel at or above said desired substantially constant pressure.

2. The centrifugal pump based fuel system of claim 1 further including means for disabling said regenerative pump when said centrifugal volute pump is pumping fuel at or above said desired substantially constant pressure.

3. The centrifugal pump based fuel system of claim 2 wherein said disabling means comprises a pressure responsive valve for halting fuel flow to said regenerative pump inlet.

4. The centrifugal pump based fuel system of claim 3 further including an ejector and said pressure responsive valve is further operative to connect said regenerative pump to said ejector.

5. The centrifugal pump based fuel system of claim 3 wherein said pressure responsive valve includes throttling means for increasingly throttling the flow of fuel to said regenerative pump inlet as pressure increases, said throttling means comprising said causing means.

6. The centrifugal pump based fuel system of claim 1 including a source of fuel connected to both said pump inlets and wherein said causing means comprises a throttling valve interconnecting said source and said regenerative pump inlet, said throttling valve having a pressure responsive surface connected to said regenerative pump outlet and operable to increasingly throttle the flow of fuel from said source to said regenerative pump inlet as pressure at said regenerative pump outlet increases to thereby reduce the pressurizing capability of said regenerative pump by generating a vapor core within said regenerative pump of sufficient length to maintain pressure at said regenerative pump outlet at said desired substantially constant pressure.

7. The centrifugal pump based fuel system of claim 1 wherein said centrifugal volute pump and said regenerative pump both have impellers on a common shaft.

8. The centrifugal pump based fuel system of claim 7 further including an inducer pump having an outlet connectable to said pump inlets, said inducer pump having an impeller on said common shaft.

9. A fuel pump system for aircraft comprising:

a source of fuel;

a high speed pump including a rotatable shaft carrying a centrifugal impeller and a regenerative impeller, a housing having a first chamber containing said centrifugal impeller and having a volute, a first inlet and a first outlet, said regenerative impeller and having a second inlet and a second outlet;

means connecting said inlets to said source;

means connecting said outlets to each other and to a fuel delivery point;

a check valve connected to said first outlet upstream of said connecting means; and a pressure responsive throttling valve having a pressure responsive surface connected to sense the pressure at said outlets and having a fuel flow passage disposed between said source and said second inlet, and operable to increasingly throttle fuel flow to said second inlet as the pressure at said outlets increases to maintain the pressure at said second outlet substantially constant at a desired value, and to close said fuel flow passage when said desired value is achieved or exceeded.

10. A fuel pump system for aircraft comprising:

a source of fuel;

a high speed pump including a rotatable shaft carrying a centrifugal impeller and a regenerative impeller, a housing having a first chamber containing said centrifugal impeller and having a volute, a first inlet and a first outlet, said regenerative impeller and having a second inlet and a second outlet;

means connecting said inlets to said source;

means connecting said outlets to each other and to a fuel delivery point;

a check valve connected to said first outlet upstream of said connecting means;

a pressure responsive throttling valve having a pressure responsive surface connected to sense the pressure at said outlets and having a fuel flow passage disposed between said source and said second inlet, and operable to increasingly throttle fuel flow to said second inlet as the pressure at said outlets increases to maintain the pressure at said second outlet substantially constant at a desired value, and to close said fuel flow passage when said desired value is achieved or exceeded; and an ejector for ejecting fuel from said regenerative pump and return it to said source;

said throttling valve further including an ejector passage for establishing fluid communication between said second outlet and said ejector when said desired value is achieved or exceeded.

11. The fuel pump system of claim 10 further including an inducer impeller on said rotatable shaft, said housing including a third chamber containing said inducer impeller and having a third inlet and a third outlet to define an inducer pump comprising said source; said ejector having an outlet connected to said third inlet, said third outlet being connected to said first inlet and to said throttling valve.

* * * * *